United States Patent Office 2,785,991
Patented Mar. 19, 1957

2,785,991

PREPARATION OF RED OXIDE OF IRON

Leonard M. Bennetch, Bethlehem, Pa., assignor, by mesne assignments, to C. K. Williams & Co., East St. Louis, Ill., a corporation of Delaware No Drawing. Application September 16, 1952,
Serial No. 309,949

8 Claims. (Cl. 106—304)

The present invention relates to the production of red ferric oxide of the type used as pigments incorporated in paint, enamel and lacquer compositions, and in natural and synthetic rubber and other plastic composition, as well as in cement, stucco and the like.

It is helpful to a clear understanding of the invention, to note that where commercially pure anhydrous red ferric oxide is produced either by calcination in a furnace or by exposing iron compounds in other ways to high temperature and pressure followed by water washing to remove soluble impurities, filtering, drying and finally grinding, the procedure is costly, firstly because it requires elaborate and expensive manufacturing and control equipment such as kilns, autoclaves, pyrometric instruments and the like; secondly because it requires elaborate collecting or recovery equipment to dispose of the obnoxious acid fumes and dust engendered in such procedure; and thirdly because it requires elaborate mills to grind the hard agglomerated, calcined and possibly sintered particles to the desired size. It is moreover difficult to control to any close degree the shade of the ferric oxide resulting from such procedure.

It is among the objects of the invention to provide a process which lends itself efficiently to large output of red ferric oxide and without obnoxious by-product formation by the use of simple equipment operated at low temperature and at atmospheric pressure with a total elimination of kilns, autoclaves or costly control equipment such as pyrometric instruments, and which process yields a uniform product of soft texture, with no marked tendency to agglomerate and therefore easily comminuted to particle sizes considerably less than one micron and of shades easily predetermined and controlled anywhere within the range between the lightest red and the deepest maroon.

Another object is to provide a process for making red ferric oxide that may be used in wet filter cake form as a pulp color for aqueous dispersion, as in imprinting wall paper, in emulsion paints, and in the coloring of cement and stucco or the like, and which may be readily converted by substituting any of a wide variety of suitable organic media for water to produce a flush color of any desired specification.

Another object is to provide an economical method for obtaining a richer shade of red ferric oxide without adding costly organic dyestuffs, lakes or toners to red ferric oxides of types that are known to the paint, enamel and lacquer industries.

Another object is to provide a method for readily producing red ferric oxides, either in the hydrated form or in the anhydrous form, the latter being produced from the former by a simple procedure without the generation of fumes, to yield a product of deepened color and enhanced tinctorial value.

Another object is to provide a method of the above type that yields red ferric oxide of any desired shade in extremely minute, rounded particles that renders the same especially advantageous as the pigment component of rubber, natural and synthetic and other plastics.

This application is a continuation-in-part of my co-pending application Serial No. 749,861, filed May 22, 1947, now abandoned.

Where an iron salt solution is reacted with substantially less than the combining proportions of alkali, a colloidal ferric hydrate results which is of Goethite structure as determined by X-ray analysis. Upon continued maturing and processing, such seed yields yellow ferric oxide monohydrate, of like Goethite structure. This yellow ferric oxide monohydrate results even where alkali is employed in proportion sufficient to neutralize anywhere up to as much as 75 to 85 percent of the iron salt solution.

The present invention is based on the surprising discovery that where the colloidal iron oxide seed is formed in novel manner, that is, by reacting an iron salt solution with close to its combining proportions of alkali, the resultant product upon further processing or maturing by growth of particles is not yellow oxide, but an entirely new precipitated red oxide of iron of great commercial value, which iron has the hematite or hydro-hematite structure as revealed by X-ray analysis.

In particular I have discovered that such precipitated red oxide of iron in the hematite or hydro-hematite form results from a starting seed in which the proportion of alkali is between 0.9 and 1.1 equivalent parts per equivalent part of iron salt. In this narrow range of proportions alone is the seed produced leading to the production of the red oxide in the subsequently employed pigment producing step. If a greater or lesser proportion of alkali is employed, the yellow oxide of Goethite structure inevitably results.

In a preferred procedure, the colloidal seed suspension is prepared by combining ferrous salt, preferably copperas ($FeSO_4.7H_2O$), in aqueous solution under atmospheric pressure and temperature, with a solution of alkali, preferably sodium hydroxide, to form an aqueous slurry. Adding the iron salt solution to the alkali is somewhat preferable to adding alkali to iron salt solution, as it yields a slurry of lower viscosity which is more easily mixed.

While copperas is ordinarily preferred as the iron salt because of its low cost as is sodium hydroxide as the alkali, it is understood that other iron salts and other alkaline agents may be employed within the scope of the invention. Among numerous other ferrous salts, the ferrous chloride or acetate or mixtures thereof may be employed. Among other alkalis, ammonium hydroxide, sodium carbonate and calcium hydroxide may be used.

In one illustrative practical manufacturing procedure, 1900 pounds of caustic soda are dissolved in water to make 4500 gallons of solution and 6600 pounds of copperas are dissolved in water to make 4500 gallons of solution. This is practically one equivalent of alkali per equivalent of iron salt. The latter solution is pumped into the former and dispersed by stirring. The ferrous hydroxide slurry thus made is subjected to oxidation, preferably by blowing air therethrough at room temperature, thereby forming the desired colloidal iron oxide seed or starting material.

This seed is further processed by heating to 50° to 100° C., but preferably 70° to 80° C., under conditions to develop upon the seed a precipitate of red oxide of iron. The desired precipitate of red oxide of iron upon the seed may be accomplished under the temperature conditions mentioned, by adding copperas crystals or solution to establish an iron salt concentration of 0.1 to 0.5 pound per gallon which serves as a catalyst and then introducing metallic iron such as mild steel scrap, and resuming oxidation preferably by blowing air through the processing tank until the initial seed material has matured and grown to the desired shade of precipitated red iron oxide.

In an alternative procedure, the initial starting slurry may be caused to mature and develop into red oxide of iron under the temperature conditions mentioned, by using alkali instead of metallic iron in the final hot phase of the process. In this modification, alkali as for example soda ash, is added to the hot starter slurry under oxidizing conditions at such a rate that the pH value of the slurry does not exceed 4.0. Thus the iron oxide necessary for the growth of the initial starting seed is furnished by the reaction of alkali and iron salt solution rather than the direct oxidation of metallic iron, as in the first procedure. The addition of alkali is continued, and additional iron salt added from time to time to insure its presence in the slurry, until the desired shade of red oxide of iron has developed, at which time the process is ended.

When the desired red iron oxide is obtained by either of the alternative procedures set forth, the pigment is separated from the slurry by known procedures of centrifugation or filtration, and is then washed and dried and the dried cake readily disintegrated.

This process will yield a light shade of red oxide in about 24 hours of operation and may be carried on to yield the deepest shade of maroon in less than one week of operation.

This is sharply to be contrasted with the use of proportions of alkali outside of the critical range of 0.9 to 1.1 equivalents of the iron salt in which in about a week of operation a light shade of yellow oxide of iron is produced and several weeks of such continuous operation would be required to produce the deepest commercial shades of yellow.

By virtue of the aqueous medium in which precipitated red iron oxides are prepared according to the present invention, the product contains a small amount of combined water and thus is hydrated. This combined water is greatest in the light red oxide and least in the deep shades but in every case is less than one molecule of combined water per molecule of ferric oxide. This is a distinction over yellow oxide of iron which has a greater proportion, that is, one full molecule of combined water per molecule of ferric oxide. Commercial yellow oxide of iron contains 10 to 12% of combined water whereas the precipitated red oxides of the present invention contain but 2 to 8% of water.

If the water combined in the red oxide of the present invention, is driven off by heat treatment for 10 minutes at about 1150° F., the red color is slightly deepened with some increase in tinctorial value. The mass tones of the precipitated reds, both before and after heat treatment, according to the present invention, are richer in color value than are corresponding shades of calcined copperas red oxides or calcined yellow oxides of iron.

In operating between the critical limits set forth in combining proportions of alkali to iron salt of 0.9 to 1.1, the starting seed is generally a hydrous ferric oxide, red in color, but it has been found that where the proportion of alkali used between the critical limits set forth, is between 0.95 and 1.0 part, the seed may be dark brown to black in color, indicating the presence of some hydrous ferrous oxide in combination with the hydrous ferric oxide. On further processing of such seed, the desired precipitated red oxide nevertheless results, so that the critical range of alkali, as above set forth, is anywhere between 0.9 to 1.1 molecular equivalents of the iron salt used in making the seed.

It will be understood that the ingredients used in the preparation of the red oxide, according to the present invention, are commercial products which are far from chemically pure. Analysis of commercial forms of yellow iron oxide produced from impure chemicals, as well as of the red iron oxide produced according to the present invention from like impure chemicals, shows a substantial divergence in the percentage of anhydrous ferric oxide present in the final product from that which would be expected were the product chemically pure. Thus while chemically pure yellow iron oxide, $Fe_2O_3 \cdot H_2O$ would have 89.8% of anhydrous ferric oxide, there is present only 87.6% of such anhydrous ferric oxide in the commercial product, the difference being accounted for by various impurities including mainly sulfur trioxide and also aluminum and titanium oxides, silica and uncombined moisture.

In the product produced according to the present invention from commercial grades of copperas and commercial grades of sodium hydroxide, the percentage of anhydrous ferric oxide would be from 88.4 to 96.0, depending on the shade in the range between the lightest red and the darkest maroon, where the like chemically pure product would range in percentage of anhydrous ferric iron oxide between 91.0 and 98.0.

Red iron oxide produced according to the present invention, would have in a typical light shade of red, an approximate formula of $Fe_2O_3 \cdot 0.88H_2O$. A typical dark maroon would show a much lower water content, the approximate formula being $Fe_2O_3 \cdot 0.22H_2O$, while in a medium shade of red the formula would be $Fe_2O_3 \cdot 0.5H_2O$. The proportions of water in the molecule, between the substantial limits set forth, would vary progressively with decrease in water as the oxide is matured from light shade to dark shade of red.

The particle size of the lightest shade of red, with the large proportion of water in the molecule, is well under 0.2 micron, that of the medium shade of red approaches 0.2 micron, and that of the darker shade is somewhat larger than 0.2 micron. In each shade the particle size is considerably smaller than that of corresponding shades produced by calcination and grinding.

By reason of the chemically precipitated character of the product, the pigment is more uniform and softer in texture than are calcined pigments and is accordingly superior for paint, enamel and lacquer compositions and is especially desirable for coating compositions that are to dry to a high gloss.

The particles are more discrete and show less tendency to form agglomerates than where they are prepared by calcination and of course there is no tendency to sinter and the soft product admits of ready disintegration without resort to the elaborate roller mill or wet grinding used in the handling of the calcined product.

The minute particles obtained by the process are of uniform color and soft texture and of rounded character, especially suitable for incorporation in natural or synthetic rubber or other synthetic plastics or plastic compositions.

The process thus provides a simple technique for producing pigment in any predetermined shade of red from the lightest to deep rich maroons by simply varying the processing time and discontinuing when the appropriate shade has been obtained.

The treatment set forth thus requires no kilns, autoclaves or expensive control equipment and gives rise to no obnoxious fumes or other objectionable by-products.

The pigment being prepared by a precipitation process as a pulp color in a liquid medium, it may conveniently be converted to a flush color by replacing the aqueous mother liquor by a suitable organic medium.

The pigment may also be used in the washed and wet filter cake form wherever it is to be employed in aqueous dispersions, such as for instance in imprinting wall paper and for incorporation in cement, stucco and the like. In all of these applications, the pigment has a higher degree of dispersion in the precipitated form than in the calcined form.

The mass, tone or color of the hydrous reds produced is richer and warmer than the corresponding shades of anhydrous calcined product, but due to the combined water content and fine particle size, the tinctorial power is less than that of the calcined product. The shade of the hydrated product prepared according to the present invention may be somewhat deepened with increase in tinctorial value, the degree of such change being greater with the lighter than with the darker product. This is readily accomplished by subjecting the hydrous red ferric oxide to heat treatment to remove that portion of the combined water required to give the desired increase in tinctorial value. Such passing off of water vapor occurs without obnoxious fumes.

As many changes could be made in the above process and many apparently widely different embodients of this invention could be made without departing from the scope of the claims, it is intended that all matter contained in the above description shall be interpreted as illustrative and not in a limiting sense.

Having thus described my invention what I claim as new and desire to secure by Letters Patent of the United States is:

1. A process of manufacturing precipitated red ferric oxide which comprises forming colloidal seed particles of hydrous iron oxide by mixing together and reacting a ferrous salt and an alkali in aqueous solution, the alkali being used in the proportion of 0.9 to 1.1 equivalents per equivalent of ferrous salt, oxidizing the ferrous precipitate formed in the slurry to the ferric state, thereupon effecting the growth of red ferric oxide upon said seed by heating to 50°–100° C. and introducing oxygen into the resulting slurry containing said seed, metallic iron and an iron salt dissolved therein, and continuing the heating and oxidation until the particles of hydrated ferric oxide formed reach the desired red color, thereby producing red hydrated ferric oxide having less than one molecule of water.

2. A process of producing precipitated red ferric oxide particles of predetermined shade of red by first producing a seed by passing air into an aqueous slurry containing ferrous salt and alkali in solution, the alkali being present in proportions of 0.9 to 1.1 equivalents per equivalent of ferrous salt and thereupon precipitating red ferric oxide to effect growth of the seed particles by applying heat within the range of 50° to 100° C. under oxidizing conditions in the presence of an added iron salt dissolved in the slurry and metallic iron until the desired shade of red has been attained, thereby producing red hydrated ferric oxide having less than one molecule of water.

3. The combination recited in claim 2, in which the applied heat is at temperature between 70° and 80° C.

4. The combination recited in claim 2, in which the catalyst of iron salt is present in a concentration of 0.1 to 0.5 pound per gallon.

5. A process of preparing precipitated red ferric oxide which comprises treating ferrous sulfate in aqueous solution with 0.9 to 1.1 equivalents of sodium hydroxide solution, oxidizing at atmospheric temperature and pressure with a current of air blown therethrough to form a colloidal iron oxide starting slurry, heating within the range of 50° to 100° C. while adding further ferrous salt as catalyst, together with metallic iron and blowing air through the mass while maintaining said temperature range, discontinuing the operation when the slurry has reached the color corresponding to the shade of red pigment desired, and thereupon filtering, washing, drying, and disintegrating the precipitated red oxide of iron.

6. The process recited in claim 2, in which the precipitated red iron oxide product is subjected to heat treatment to drive off residual combined water with resultant darkening of color and increase in tinctorial value.

7. The process recited in claim 6, in which the heat treatment is for about 10 minutes at about 1150° F.

8. A process of preparing precipitated red ferric oxide which comprises treating a ferrous salt in aqueous solution with 0.9 to 1.1 equivalents of an alkali hydroxide solution, oxidizing by means of a current of air blown through the solution, thereby forming a colloidal iron oxide starting slurry, heating said slurry containing a ferrous salt as catalyst and metallic iron, and blowing air through the mass while maintaining the temperature within the range of 50°–100° C., discontinuing the operation when the ferric oxide formed in the slurry has reached the color corresponding to the shade of red pigment desired, and thereupon filtering, washing, drying, and disintegrating the precipitated red oxide of iron.

References Cited in the file of this patent

UNITED STATES PATENTS

| 1,327,061 | Renniman et al. | Jan. 6, 1920 |
| 1,368,748 | Renniman et al. | Feb. 15, 1921 |
| 2,127,907 | Fireman | Aug. 23, 1938 |
| 2,388,659 | Ryan | Nov. 6, 1945 |
| 2,558,303 | Marcot et al. | June 26, 1951 |
| 2,558,304 | Marcot et al. | June 26, 1951 |

FOREIGN PATENTS

| 492,945 | Germany | Mar. 1, 1930 |
| 653,358 | Great Britain | May 16, 1951 |

OTHER REFERENCES

Page 782 of Mellor's Treatise of Inorganic and Theoretical Chemistry, vol. 13, part 2 (Fe), 1934 ed.